UNITED STATES PATENT OFFICE.

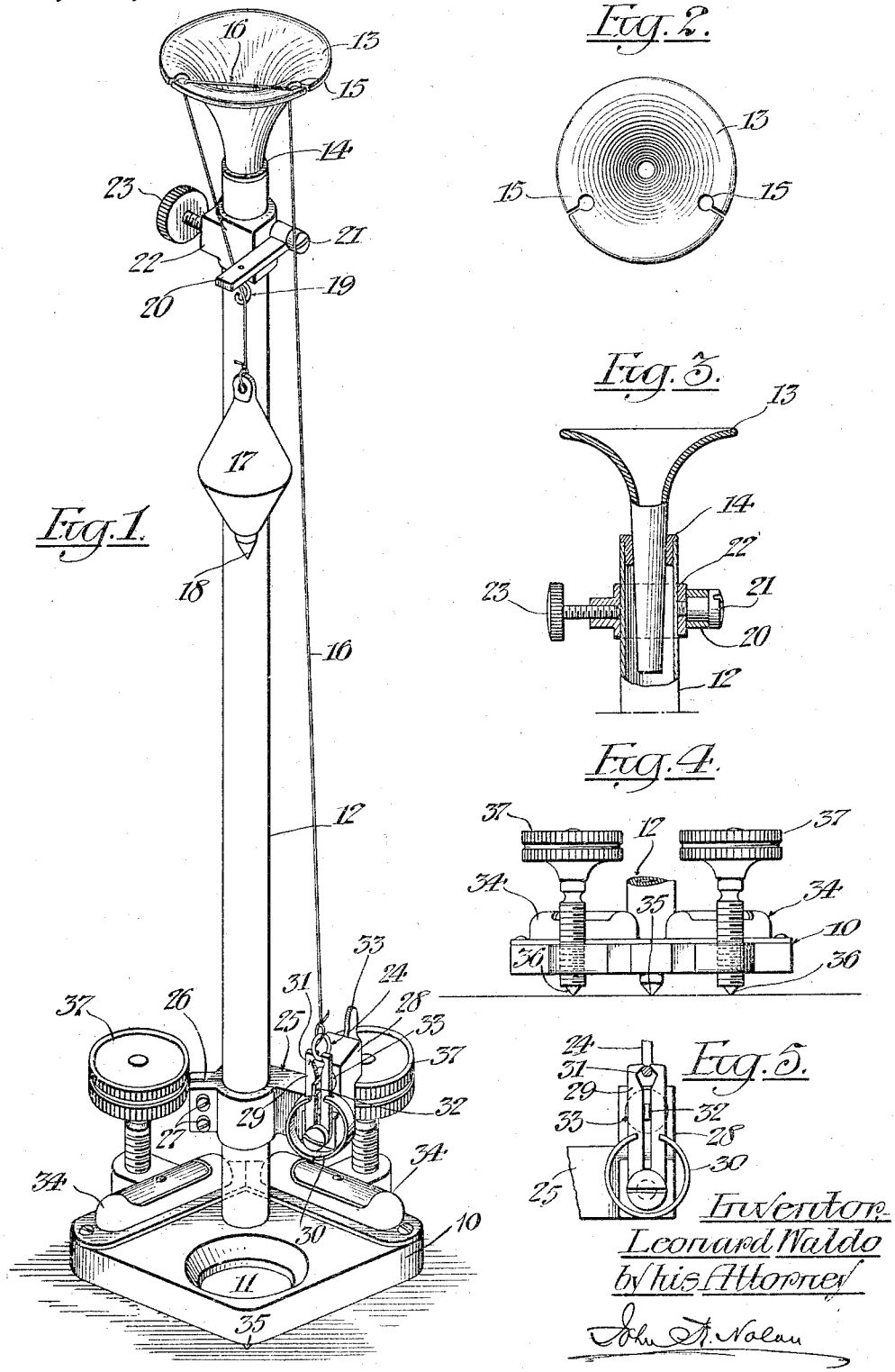

LEONARD WALDO, OF PLAINFIELD, NEW JERSEY, ASSIGNOR TO PALO COMPANY, OF NEW YORK, N. Y., A CORPORATION OF NEW YORK.

APPARATUS FOR MEASURING THE HARDNESS OF METAL, &c.

1,228,503.      Specification of Letters Patent.      Patented June 5, 1917.

Application filed November 7, 1916. Serial No. 129,928.

*To all whom it may concern:*

Be it known that I, LEONARD WALDO, a citizen of the United States, and resident of Plainfield, in the county of Union and State of New Jersey, have invented certain new and useful Improvements in Apparatus for Measuring the Hardness of Metal, &c., of which the following is a specification.

This invention relates to an apparatus for measuring the hardness of metal and other materials, having relation especially to that class of apparatus whereby a depression is made by a predetermined force in the surface of the material to be tested, which depression is thereafter calibrated.

The object of my invention is to provide an apparatus of the class mentioned which is simple and durable in construction, is readily applied to and operated on the material which is to be measured as to hardness, and is efficient and reliable in its operation.

Accordingly the invention, generally stated, comprises a column adapted to be supported on the surface of the material to be measured; a weight having an impression point, a light flexible strand for suspending said weight at a predetermined height on the column, and means for releasing said strand without disturbance of the top of the apparatus, whereby the weight may be permitted to drop without sensible friction and its point to strike the surface of the material with a predetermined force.

The invention also comprises, in a structure of the character described, an element whereby the suspension strand is so positioned and supported above the weight as to minimize the friction of the strand on said element in the descent of the weight, which element also serves as an efficient means whereby the height of the weight can be nicely adjusted preparatory to its release, as occasion may require.

The invention also comprises, in a structure of the character described, leveling means whereby the accurate setting up of the apparatus is facilitated under conditions of difficulty.

The invention also comprises various features of construction and arrangements of parts which will be hereinafter described and claimed.

In the drawings—

Figure 1 is a perspective view of an apparatus embodying the preferred form of my invention, the structure being illustrated as set up and adjusted preparatory to the release of the pendant weight.

Fig. 2 is a plan of an adjustable flaring head through apertures in which the suspension strand for the weight is threaded.

Fig. 3 is a sectional elevation of said head and the adjacent portion of the column, showing also an adjustable guide device for the suspension strand.

Fig. 4 is a rear elevation of the base of the apparatus showing leveling devices therefor.

Fig. 5 is a detail of locking and releasing means for the suspension strand.

Referring to the drawings, 10 designates a base of suitable shape and size for its intended purpose. In the present instance this base comprises a rectangular body of metal having a vertical opening 11 therein, and having also certain leveling devices which will be presently described. Rising from the base, in rear of the opening, is a column 12, preferably of tubular metal, which is surmounted by a hollow flaring head 13, fashioned similarly to a conical mouth piece. The stem of this head extends into the open upper end of the column, being therein equipped with a suitably-disposed gasket 14 of rubber or the like, whereby the head has capacity for bodily rotary adjustment about the axis of the column and can be frictionally held in positions of adjustment for a purpose below explained. In the peripheral portion of the head 13 are two spaced apertures 15, of key-hole form, through which is passed and drawn from one to the other across the top of the head, a suspension strand 16 for a weight 17. This weight is preferably in the form of a plummet weighing, say, one-tenth of a pound, avoirdupois, having its lower end provided with a case hardened polished steel point 18 of exactly 60° angle. The point of the depending plummet is maintained in vertical alinement with the center of the opening in the base by means of a suitably-disposed guide-eye 19 through which the pendant portion of the strand extends. This guide-eye is conveniently attached to the under side of a horizontal arm 20 which is adjustably secured by means of a screw 21 to a supporting piece 22 on the upper portion of the column; said piece being, in the present instance, a vertically perforated member which is slid upon the column and nicely adjusted thereon to effect, in connection with the adjustment of the arm 20, the accurate positioning of the guide eye in respect to the center of the opening in the base. The member 22 is provided with a set-screw 23 whereby it can be secured in the desired position of adjustment.

On the free end of the suspension strand is a ring 24 which, when the plummet is in raised position, is adapted to be releasably held by a suitable latch mechanism which is adjustably mounted on the lower portion of the column. In the present instance this mechanism includes an arm 25 having at one end a split clamp 26 which is adjustably held on the column by screws 27, and having at the other end a bearing portion 28 to which the lower ends of two vertically disposed latch jaws 29 are pivoted. These jaws are held normally in closed or gripping position by means of a split spring ring 30 which is attached at its ends to the respective jaws; the upper portions of such jaws being appropriately notched on their inner edges, as at 31, so as to receive the interposed ring 24 of the suspension strand. Extending between the jaws is the thin flattened extension 32 of a key stud 33 which is rotatably mounted in the bearing portion 28, whereby when said stud is partially turned the edges of the extension bear uniformly against the opposing inner edges of the jaws and simultaneously spread the latter, thereby releasing the ring without disturbing the apparatus or displacing the suspended plummet, which latter, being unsupported, at once drops and its hardened conical point strikes the exposed surface of the metal at the bottom of the opening. The point makes in such surface a conical depression whereof the base is upward and the point is in the material. This being done the diameter of the circular base of the depression is measured, and the result is compared with a prescribed scale of hardness values in order to determine the hardness of the material being tested.

The leveling devices above referred to comprise two cross-levels 34 affixed to the top of the base, and three spaced bearing points depending from the under side of the base, which points are adapted to rest upon the surface of the material to be tested. The point 35 is a fixture while the others 36 are formed on vertical adjusting screws 37 in the base. By manipulating these screws, or either of them, as required, the apparatus can be accurately adjusted, and its adjustment indicated by the levels, in order to insure the accurate centering of the plummet in relation to the opening in the base. These leveling devices facilitate the setting up of the apparatus under conditions of difficulty, such for example, as upon rails in place, or upon parts of large machinery masses or ordnance surfaces.

It is to be noted that the suspension strand is composed of light silk fiber for the reason that such material has practically no appreciable friction when released and following the plummet in its flight. It is also to be noted that the plummet guide at the top and the latch support at the bottom of the column can be rotatively adjusted relatively to each other and to the column in order to insure the correct positioning of the suspension strand, and that the flaring head can be turned to the right or left so as to adjust the weight with its point at a precise distance from the surface against which it is adapted to impinge when released. Moreover the spaced relation of the peripheral apertures in the flaring head avoids acute angular bends of the thread as it is flexed about the head and drawn to and through the guide structure, thus minimizing the friction.

It is to be understood that I do not limit myself to the specific details of construction herein shown and described, as the same may be modified without departing from the principle of the invention as defined in the appended claims.

I claim—

1. An apparatus of the class described comprising a supporting structure, an elevated member thereon having two horizontally-spaced thread guides, a lower member having a thread guide, a light flexible strand drawn through the respective guides and flexed about said elevated member, a plummet secured to the end of that portion of the strand depending through the lower guide, said plummet having a conical impression point, and means for releasably holding the other end of the strand to maintain the plummet temporarily suspended.

2. An apparatus of the class described comprising a supporting structure, an elevated member thereon having two horizontally-spaced thread guides, a lower member having a thread guide, said elevated member being adjustable to vary the position of the guides thereof in relation to the lower guide, a light flexible strand drawn through the respective guides and flexed about said elevated member, a plummet secured to the end of that portion of the strand depending through the lower guide, said plummet having a conical impression point, and means for releasably holding the other end of the strand to maintain the plummet temporarily suspended.

3. An apparatus of the class described comprising a supporting structure including a rotatively adjustable head having therein spaced apertures, a suspension strand adapted to be passed through said apertures and flexed upon the head, a pendant point-bearing weight on said strand, and means for releasably holding the strand with the weight in suspended position.

4. An apparatus of the class described comprising a base, a column thereon, a flaring head rotatively adjustable on the top of the column, said head having spaced peripheral apertures, a thread guide eye supported below said head, a suspension strand adapted to be passed through said apertures and flexed upon the head, one end of the strand being threaded through the guide eye, a pendant point-bearing weight on the end of the strand beneath said eye, and means for releasably holding the other end of the strand.

5. An apparatus of the class described comprising a base, a column thereon, a rotatively adjustable head having therein spaced apertures, a thread guide eye, a support therefor adjustably mounted on the column, a suspension strand adapted to be passed through said apertures and flexed upon the head, one end of the strand being threaded through the guide eye, a pendant point-bearing weight on the end of the strand beneath said eye, and means for releasably holding the other end of the strand.

6. An apparatus of the class described comprising a base, a column thereon, a rotatively adjustable head having therein spaced apertures, a thread guide eye, a support therefor adjustably mounted on the column, a suspension strand adapted to be passed through said apertures and flexed upon the head, one end of the strand being threaded through the guide eye, a pendant point-bearing weight on such end of the strand, and means for releasably holding the other end of the strand, said means being adjustably mounted on the column.

7. An apparatus of the class described comprising a base, leveling means thereon, a column on said base, a guide element at the top of the column, a suspension strand adapted to be flexed about the guide element, a pendant point-bearing weight on one end of said strand, and means for releasably holding the other end of the strand.

8. An apparatus of the class described, comprising a base having an opening therein, levels and adjusting screws on said base, a column on the base, a flaring head rotatively adjustable on the column, said head having spaced peripheral apertures therein, a guide eye, a support therefor adjustably mounted on the column, a suspension strand adapted to be passed through said apertures and flexed upon the head, one end of the strand being threaded through the guide eye, a plummet-like weight bearing an impression point, said weight being secured to the end of the strand beneath said eye, and means for releasably holding the other end of the strand, said means being adjustably mounted on the column.

Signed at New York, in the county and State of New York, this sixth day of November, A. D. 1916.

LEONARD WALDO.

Copies of this patent may be obtained for five cents each, by addressing the "Commissioner of Patents, Washington, D. C."